United States Patent Office 3,136,620
Patented June 9, 1964

3,136,620
COMPOSITION AND METHOD FOR REGULATING PLANT GROWTH
Harry C. Bucha and Raymond W. Luckenbaugh, Wilmington, Del., assignors to E. I. du Pont de Nemours and Company, Wilmington, Del., a corporation of Delaware
No Drawing. Filed Dec. 18, 1961, Ser. No. 160,314
2 Claims. (Cl. 71—2.5)

This invention relates to the use of N-substituted oxo-pyrrolidinecarboxylic acids and their derivatives as plant growth regulants.

More particularly, this invention relates to plant growth regulant compositions and methods employing 1-phenyl and 1-(substituted phenyl)-5-oxopyrrolidinecarboxylic acids, their salts, esters or amides having the structure:

(I)
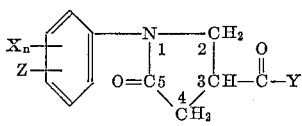

wherein

X is hydrogen, fluorine, chlorine, bromine or iodine;
$n$ is a positive whole integer less than 3;
Z is hydrogen, trifluoromethyl, fluorine, chlorine, bromine or iodine;
Y is OH, $OR_1$, $NR_2R_3$ or OM;
$R_1$ is an alkyl radical containing less than 9 carbon atoms;
$R_2$ and $R_3$ are the same or different and are hydrogen and lower alkyl radicals of less than 7 carbon atoms each; and
M is sodium, potassium, calcium, lithium, magnesium, zinc, cupric, ferric, ammonium and amine salts containing less than 15 carbon atoms in the amine radical.

The compositions of this invention have utility for regulating plant growth on a wide variety of plant species. As plant growth regulants, various compounds of Formula I:

(1) Retard woody and herbaceous plants;
(2) Stimulate growth of plants;
(3) Produce axillary stimulation of broadleaved plants;
(4) Produce stooling and tillering of grasses;
(5) Control flowering and fruit set;
(6) Prolong dormancy of plants;
(7) Produce albinism;
(8) Prevent regrowth and bleach out chlorophyll (as additives to other cotton defoliants);
(9) Serve as antagonists to gibberellic acid.

The activity of the compounds of this invention in exerting several types of plant growth regulation effects on a wide variety of plant species is quite unusual. These compounds can also exert herbicidal action on certain types of plants at high rates of application.

Generically in this application, the term plant growth regulant applies to organic cpds. which are capable of modifying plant growth (i.e.—stimulate, inhibit, or otherwise alter growth). The compounds of Formula I are termed plant growth regulants.

One can readily prepare the compounds by the usual methods known to the art. For example, the free acids of the invention are most generally prepared by fusion of a mixture of itaconic acid and a selected amine, although in certain cases the reaction may be brought about by refluxing in water solution. This fusion can consist of heating at 120° for 30 minutes to several hours, but heating to 180° for a period of several minutes will also suffice. See the following literature references for further information:

Anschütz and Reuter, Ann., 254, 139 (1889), describe the preparation of 1-phenyl-5-oxo-3-pyrrolidinecarboxylic acid.

Paytash, Sparrow and Gatho, J. Am. Chem. Soc., 72, 1415 (1950), describe the preparation of:

1-o-chlorophenyl-5-oxo-3-pyrrolidinecarboxylic acid
1-m-chlorophenyl-5-oxo-3-pyrrolidinecarboxylic acid
1-p-chlorophenyl-5-oxo-3-pyrrolidinecarboxylic acid
1-p-bromophenyl-5-oxo-3-pyrrolidinecarboxylic acid
1-(2,4-dichlorophenyl)-5-oxo-3-pyrrolidinecarboxylic acid
1-(2,5-dichlorophenyl)-5-oxo-3-pyrrolidinecarboxylic acid Other less convenient procedures for preparing the free acids are known to the art.

Amides of 1-phenyl and 1-(substituted phenyl)-5-oxo-3-pyrrolidinecarboxylic acid, also called aryl-5-oxo-3-pyrrolidinecarboxylic acid, are readily prepared by treating the acid chloride with an appropriate amine at room temperature or higher. The acid chloride is prepared by methods well known to the art, e.g. using thionyl chloride in benzene. The following equation is illustrative of this process:

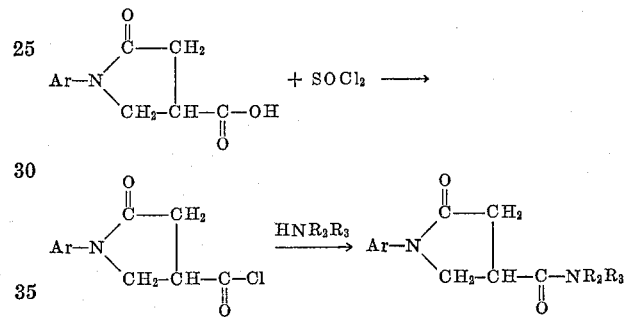

wherein

Ar is an aryl group consisting of a 1-phenyl or 1-(substituted phenyl) group, substituted as described above, and $R_2$ and $R_3$ have the same meaning as above.

The amides of 1-aryl derivatives are generally colorless and have melting points near or below that of the acids.

Esters of 1-phenyl and 1-(substituted phenyl)-5-oxo-3-pyrrolidinecarboxylic acids are most conveniently prepared from the acid chlorides by treatment with an appropriate alcohol, although direct esterification is also possible. The following equation is illustrative of this process:

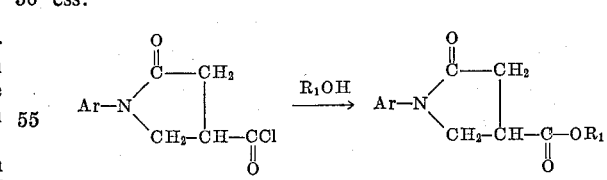

wherein Ar and $R_1$ have the same meaning as above.

Treatment of an itaconic diester with an amine also results in esters of substituted 5-oxo-3-pyrrolidinecarboxylic acids. (See C. J. Knuth, Chas. Pfizer and Co., U.S. 2,811,496/57.) 1-alkyl, aryl, or aralkyl-5-oxo-3-pyrrolidinecarboxylic acid esters, the alcohol moiety of the ester being alkyl of 1–8 carbon atoms, are described. C. J. Knuth and P. F. Bruins, Ind. and Eng. Chem., 47, 1572 (1955), contains the information of U.S. 2,811,496 in expanded form.

Amine salts of 1-aryl-5-oxo-3-pyrrolidinecarboxylic acids are conveniently prepared by treatment of the free acids in solution with an appropriate amine followed by evaporation of the solvent and excess amine under reduced pressure. The following equation is illustrative of this process:

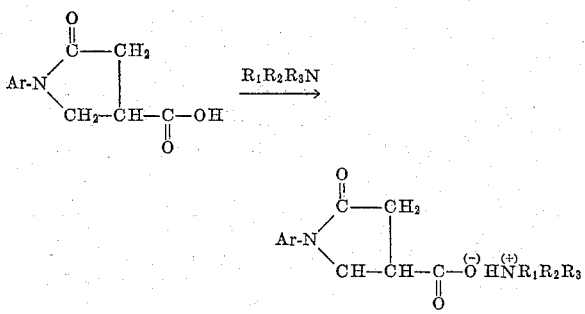

wherein Ar, $R_1$, $R_2$, and $R_3$ have the same meaning as above.

Alkali metal salts are conveniently prepared by combination of warm alcohol solutions of equimolar amounts of the free acid and an alkali hydroxide or alcoholate. The precipitated salt is filtered after cooling. These reactions are illustrated by the following equations:

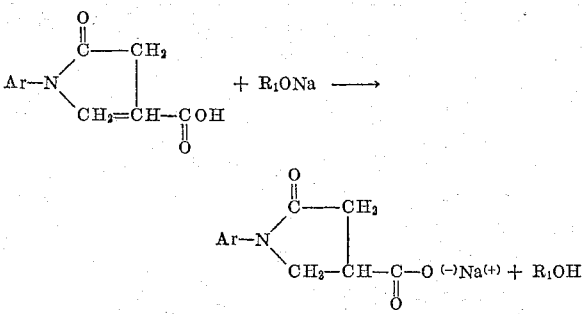

wherein Ar and $R_1$ have the same meaning as above.

Water insoluble salts, e.g. iron salts, are prepared by addition of an aqueous solution of an inorganic water soluble salt of the metal to an aqueous solution of the sodium salt of the acid. The precipitated metal salt is filtered and rinsed. The following equation is illustrative of this process:

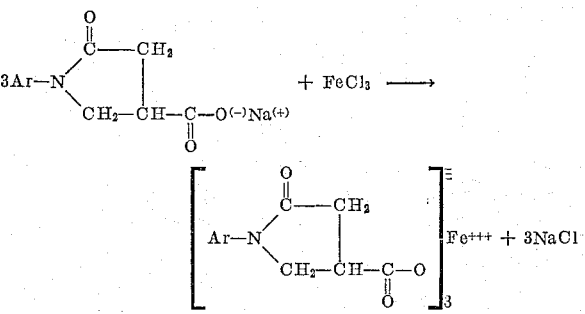

wherein Ar has the same meaning as above.

Illustrative of compounds made in the above manner which can be employed in this invention are the following:

(1) 1-(p-chlorophenyl)-5-oxo-3-pyrrolidinecarboxylic acid
(2) 1-phenyl-5-oxo-3-pyrrolidinecarboxylic acid
(3) 1-(o-chlorophenyl)-5-oxo-3-pyrrolidinecarboxylic acid
(4) 1-(m-chlorophenyl)-5-oxo-3-pyrrolidinecarboxylic acid
(5) 1-(4-chloro-3-alpha,alpha,alpha-trifluoromethylphenyl)-5-oxo-3-pyrrolidinecarboxylic acid
(6) 1-(3,4-dichlorophenyl)-5-oxo-3-pyrrolidinecarboxylic acid
(7) 1-(p-bromophenyl)-5-oxo-3-pyrrolidinecarboxylic acid
(8) N,N-diethyl-1-(p-chlorophenyl)-5-oxo-3-pyrrolidinecarboxamide
(9) N,N-dimethyl-1-(3,4-dichlorophenyl)-5-oxo-3-pyrrolidinecarboxamide
(10) 1-(3,4-dichlorophenyl)-5-oxo-3-pyrrolidinecarboxylic acid, ethyl ester
(11) 1-(p-bromophenyl)-5-oxo-3-pyrrolidinecarboxylic acid, sodium salt
(12) 1-(p-chlorophenyl)-5-oxo-3-pyrrolidinecarboxylic acid, sodium salt
(13) 1-(3,4-dichlorophenyl)-5-oxo-3-pyrrolidinecarboxylic acid, ammonium salt
(14) 1-(m-chlorophenyl)-5-oxo-3-pyrrolidinecarboxylic acid, sodium salt
(15) 1-(3,4-dichlorophenyl)-5-oxo-3-pyrrolidinecarboxylic acid, sodium salt
(16) 1-(3,4-dichlorophenyl)-5-oxo-3-pyrrolidinecarboxylic acid, potassium salt
(17) 1-(3,4-dichlorophenyl)-5-oxo-3-pyrrolidinecarboxylic acid, lithium salt
(18) 1-(3,4-dichlorophenyl)-5-oxo-3-pyrrolidinecarboxylic acid, calcium (II) salt
(19) 1-(3,4-dichlorophenyl)-5-oxo-3-pyrrolidinecarboxylic acid, copper (II) salt
(20) 1-(3,4-dichlorophenyl)-5-oxo-3-pyrrolidinecarboxylic acid, zinc (II) salt
(21) 1-(3,4-dichlorophenyl)-5-oxo-3-pyrrolidinecarboxylic acid, magnesium (II) salt
(22) 1-(3,4-dichlorophenyl)-5-oxo-3-pyrrolidinecarboxylic acid, butoxypropyl ester
(23) 1-(3,4-dichlorophenyl)-5-oxo-3-pyrrolidinecarboxylic acid, 2-ethylhexyl ester
(24) 1-(3,4-dichlorophenyl)-5-oxo-3-pyrrolidinecarboxylic acid, ethyleneglycol ester
(25) 1-(3,4-dichlorophenyl)-5-oxo-3-pyrrolidinecarboxylic acid, dimethylamine salt
(26) 1-(3,4-dichlorophenyl)-5-oxo-3-pyrrolidinecarboxylic acid, triethylamine salt
(27) 1-(3,4-dichlorophenyl)-5-oxo-3-pyrrolidinecarboxylic acid, hydroxyethylamine salt
(28) N-isopropyl-N-methyl-1-(3,4-dichlorophenyl)-5-oxo-3-pyrrolidinecarboxamide
(29) 1-(p-chlorophenyl)-5-oxo-3-pyrrolidinecarboxylic acid, potassium salt
(30) 1-(p-chlorophenyl)-5-oxo-3-pyrrolidinecarboxylic acid, lithium salt
(31) 1-(p-chlorophenyl)-5-oxo-3-pyrrolidinecarboxylic acid, calcium (II) salt
(32) 1-(p-chlorophenyl)-5-oxo-3-pyrrolidinecarboxylic acid, copper (II) salt
(33) 1 - (p - chlorophenyl) - 5 - oxo - 3 - pyrrolidinecarboxylic acid, zinc (II) salt
(34) 1 - (p - chlorophenyl) - 5 - oxo - 3 - pyrrolidinecarboxylic acid, magnesium (II) salt
(35) 1 - (p - chlorophenyl) - 5 - oxo - 3 - pyrrolidinecarboxylic acid, butoxypropyl ester
(36) 1 - (p - chlorophenyl) - 5 - oxo - 3 - pyrrolidinecarboxylic acid, 2-ethylhexyl ester
(37) 1 - (p - chlorophenyl) - 5 - oxo - 3 - pyrrolidinecarboxylic acid, ethyleneglycol ester
(38) 1 - (p - chlorophenyl) - 5 - oxo - 3 - pyrrolidinecarboxylic acid, dimethylamine salt
(39) 1 - (p - chlorophenyl) - 5 - oxo - 3 - pyrrolidinecarboxylic acid, triethylamine salt
(40) 1 - (p - chlorophenyl) - 5 - oxo - 3 - pyrrolidinecarboxylic acid, hydroxyethylamine salt
(41) N - isopropyl - N - methyl - 1 - (p-chlorophenyl)-5-oxo-3-pyrrolidinecarboxamide
(42) 1 - phenyl - 5 - oxo - 3 - pyrrolidinecarboxylic acid, sodium salt
(43) 1 - phenyl - 5 - oxo - 3 - pyrrolidinecarboxylic acid, potassium salt
(44) 1 - phenyl - 5 - oxo - 3 - pyrrolidinecarboxylic acid, lithium salt
(45) 1 - phenyl - 5 - oxo - 3 - pyrrolidinecarboxylic acid, calcium (II) salt

(46) 1 - phenyl - 5 - oxo - 3 - pyrrolidinecarboxylic acid, copper (II) salt
(47) 1 - phenyl - 5 - oxo - 3 - pyrrolidinecarboxylic acid, zinc (II) salt
(48) 1 - phenyl - 5 - oxo - 3 - pyrrolidinecarboxylic acid, magnesium (II) salt
(49) 1 - phenyl - 5 - oxo - 3 - pyrrolidinecarboxylic acid, butoxypropyl ester
(50) 1 - phenyl - 5 - oxo - 3 - pyrrolidinecarboxylic acid, 2-ethylhexyl ester
(51) 1 - phenyl - 5 - oxo - 3 - pyrrolidinecarboxylic acid, ethyleneglycol ester
(52) 1 - phenyl - 5 - oxo - 3 - pyrrolidinecarboxylic acid, dimethylamine salt
(53) 1 - phenyl - 5 - oxo - 3 - pyrrolidinecarboxylic acid, triethylamine salt
(54) 1 - phenyl - 5 - oxo - 3 - pyrrolidinecarboxylic acid, hydroxyethylamine salt
(55) N - isopropyl - N - methyl - 1 - phenyl - 5 - oxo - 3-pyrrolidinecarboxamide
(56) 1 - (4 - chloro - 3 - alpha,alpha,alpha - trifluoromethylphenyl) - 5 - oxo - 3 - pyrrolidinecarboxylic acid, sodium salt
(57) 1 - (4 - chloro - 3 - alpha,alpha,alpha - trifluoromethylphenyl) - 5 - oxo - 3 - pyrrolidinecarboxylic acid, potassium salt
(58) 1 - (4 - chloro - 3 - alpha,alpha,alpha - trifluoromethylphenyl) - 5 - oxo - 3 - pyrrolidinecarboxylic acid, lithium salt
(59) 1 - (4 - chloro - 3 - alpha,alpha,alpha - trifluoromethylphenyl) - 5 - oxo - 3 - pyrrolidinecarboxylic acid, calcium (II) salt
(60) 1 - (4 - chloro - 3 - alpha,alpha,alpha - trifluoromethylphenyl) - 5 - oxo - 3 - pyrrolidinecarboxylic acid, copper (II) salt
(61) 1 - (4 - chloro - 3 - alpha,alha,alpha - trifluoromethylphenyl) - 5 - oxo - 3 - pyrrolidinecarboxylic acid, zinc (II) salt
(62) 1 - (4 - chloro - 3 - alpha,alpha,alpha - trifluoromethylphenyl ) - 5 - oxo - 3 - pyrrolidinecarboxylic acid, magnesium (II) salt
(63) 1 - (4 - chloro - 3 - alpha,alpha,alpha - trifluoromethylphenyl) - 5 - oxo - 3 - pyrrolidinecarboxylic acid, butoxypropyl ester
(64) 1 - (4 - chloro - 3 - alpha,alpha,alpha - trifluoromethylphenyl) - 5 - oxo - 3 - pyrrolidinecarboxylic acid, 2-ethylhexyl ester
(65) 1 - (4 - chloro - 3 - alpha,alpha,alpha - trifluoromethylphenyl) - 5 - oxo - 3 - pyrrolidinecarboxylic acid, ethyleneglycol ester
(66) 1 - (4 - chloro - 3 - alpha,alpha,alpha - trifluoromethylphenyl) - 5 - oxo - 3 - pyrrolidinecarboxylic acid, dimethylamine salt
(67) 1 - (4 - chloro - 3 - alpha,alpha,alpha - trifluoromethylphenyl ) - 5 - oxo - 3 - pyrrolidinecarboxylic acid, triethylamine salt
(68) 1 - (4 - chloro - 3 - alpha,alpha,alpha - trifluoromethylphenyl) - 5 - oxo - 3 - pyrrolidinecarboxylic acid, hydroxyethylamine salt
(69) N - isopropyl - N - methyl - 1 - (4 - chloro - 3 - alpha,alpha,alpha - trifluoromethylphenyl) - 5 - oxo - 3 - pyrrolidinecarboxamide
(70) 1 - (p - bromophenyl) - 5 - oxo - 3 - pyrrolidinecarboxylic acid, sodium salt
(71) 1 - (p - bromophenyl) - 5 - oxo - 3 - pyrrolidinecarboxylic acid, potassium salt
(72) 1 - (p - bromophenyl) - 5 - oxo - 3 - pyrrolidinecarboxylic acid, lithium salt
(73) 1 - (p - bromophenyl) - 5 - oxo - 3 - pyrrolidinecarboxylic acid, calcium (II) salt
(74) 1 - (p - bromophenyl) - 5 - oxo - 3 - pyrrolidinecarboxylic acid, copper (II) salt
(75) 1 - (p - bromophenyl) - 5 - oxo - 3 - pyrrolidinecarboxylic acid, zinc (II) salt
(76) 1 - (p - bromophenyl) - 5 - oxo - 3 - pyrrolidinecarboxylic acid, magnesium (II) salt
(77) 1 - (p - bromophenyl) - 5 - oxo - 3 - pyrrolidinecarboxylic acid, butoxypropyl ester
(78) 1 - (p - bromophenyl) - 5 - oxo - 3 - pyrrolidinecarboxylic acid, 2-ethylhexyl ester
(79) 1 - (p - bromophenyl) - 5 - oxo - 3 - pyrrolidinecarboxylic acid, dimethylamine salt
(80) 1 - (p - bromophenyl) - 5 - oxo - 3 - pyrrolidinecarboxylic acid, triethylamine salt
(81) 1 - (p - bromophenyl) - 5 - oxo - 3 - pyrrolidinecarboxylic acid, hydroxyethylamine salt
(82) N - isopropyl - N - methyl - 1 - (p - bromophenyl)- 5 - oxo - 3 - pyrrolidinecarboxamide
(83) 1 - (p - iodophenyl) - 5 - oxo - 3 - pyrrolidinecarboxylic acid, sodium salt
(84) 1 - (p - iodophenyl) - 5 - oxo - 3 - pyrrolidinecarboxylic acid, potassium salt
(85) 1 - (p - iodophenyl) - 5 - oxo - 3 - pyrrolidinecarboxylic acid, lithium salt
(86) 1 - (p - iodophenyl) - 5 - oxo - 3 - pyrrolidinecarboxylic acid, calcium (II) salt
(87) 1 - (p - iodophenyl) - 5 - oxo - 3 - pyrrolidinecarboxylic acid, copper (II) salt
(88) 1 - (p - iodophenyl) - 5 - oxo - 3 - pyrrolidinecarboxylic acid, zinc (II) salt
(89) 1 - (p - iodophenyl) - 5 - oxo - 3 - pyrrolidinecarboxylic acid, magnesium (II) salt
(90) 1 - (p - iodophenyl) - 5 - oxo - 3 - pyrrolidinecarboxylic acid, butoxypropyl ester
(91) 1 - (p - iodophenyl) - 5 - oxo - 3 - pyrrolidinecarboxylic acid, 2-ethylhexyl ester
(92) 1 - (p - iodophenyl) - 5 - oxo - 3 - pyrrolidinecarboxylic acid, ethyleneglycol ester
(93) 1 - (p - iodophenyl) - 5 - oxo - 3 - pyrrolidinecarboxylic acid, dimethylamine salt
(94) 1 - (p - iodophenyl) - 5 - oxo - 3 - pyrrolidinecarboxylic acid, triethylamine salt
(95) 1 - (p - iodophenyl) - 5 - oxo - 3 - pyrrolidinecarboxylic acid, hydroxyethylamine salt
(96) N - isopropyl - N - methyl - 1 - (p - iodophenyl) - 5-oxo-3-pyrrolidinecarboxamide
(97) 1 - (p - fluorophenyl) - 5 - oxo - 3 - pyrrolidinecarboxylic acid, sodium salt
(98) 1 - (p - fluorophenyl) - 5 - oxo - 3 -pyrrolidinecarboxylic acid, potassium salt
(99) 1 - (p - fluorophenyl) - 5 - oxo - 3 - pyrrolidinecarboxylic acid, lithium salt
(100) 1 - p - fluorophenyl) - 5 - oxo - 3 - pyrrolidinecarboxylic acid, calcium (II) salt
(101) 1 - (p - fluorophenyl) - 5 - oxo - 3 - pyrrolidinecarboxylic acid, copper (II) salt
(102) 1 - (p - fluorophenyl) - 5 - oxo - 3 - pyrrolidinecarboxylic acid, zinc (II) salt
(103) 1 - (p - fluorophenyl) - 5 - oxo - 3 - pyrrolidinecarboxylic acid, magnesium (II) salt
(104) 1 - (p - fluorophenyl) - 5 - oxo - 3 - pyrrolidinecarboxylic acid, butoxypropyl ester
(105) 1 - (p - fluorophenyl) - 5 - oxo - 3 - pyrrolidinecarboxylic acid, 2-ethylhexyl ester
(106) 1 - (p - fluorophenyl) - 5 - oxo - 3 - pyrrolidinecarboxylic acid, ethyleneglycol ester
(107) 1 - (p - fluorophenyl) - 5 - oxo - 3 - pyrrolidinecarboxylic acid, dimethylamine salt
(108) 1 - (p - fluorophenyl) - 5 - oxo - 3 - pyrrolidinecarboxylic acid, triethylamine salt
(109) 1 - (p - fluorophenyl) - 5 - oxo - 3 - pyrrolidinecarboxylic acid, hydroxyethylamine salt
(110) N - isopropyl - N - methyl - 1 - (p - fluorophenyl)- 5-oxo-3-pyrrolidinecarboxamide
(111) 1 - (2,4,6 - trichlorophenyl) - 5 - oxo - 3 - pyrrolidinecarboxylic acid
(112) 1 - (2,4,6 - trichlorophenyl) - 5 - oxo - 3 - pyrrolidinecarboxylic acid, sodium salt (113) 1 - (2,4,6 - trichlorophenyl) - 5 - oxo - 3 - pyrrolidinecarboxylic acid, potassium salt
(114) 1 - (2,4,6-trichlorophenyl) - 5 - oxo - 3 - pyrrolidinecarboxylic acid, calcium (II) salt
(115) 1 - (2,4,6 - trichlorophenyl) - 5 - oxo - 3 - pyrrolidinecarboxylic acid, methyl ester
(116) 1 - (2,4,6 - trichlorophenyl) - 5 - oxo - 3 - pyrrolidinecarboxylic acid, butoxypropyl ester
(117) 1 - (2,4,6 - trichlorophenyl) - 5 - oxo - 3 - pyrrolidinecarboxylic acid, dimethylamine salt
(118) 1 - (2,4,5 - trichlorophenyl) - 5 - oxo - 3 - pyrrolidinecarboxylic acid
(119) 1 - (2,4,5 - trichlorophenyl) - 5 - oxo - 3 - pyrrolidinecarboxylic acid, sodium salt
(120) 1 - (2,4,5 - trichlorophenyl) - 5 - oxo - 3 - pyrrolidinecarboxylic acid, potassium salt
(121) 1 - (2,4,5 - trichlorophenyl) - 5 - oxo - 3 - pyrrolidinecarboxylic acid, lithium salt
(122) 1 - (2,4,5 - trichlorophenyl) - 5 - oxo - 3 - pyrrolidinecarboxylic acid, ethyl ester
(123) 1 - (2,4,5 - trichlorophenyl) - 5 - oxo - 3 - pyrrolidinecarboxylic acid, isopropyl ester
(124) 1 - (2,4,5 - trichlorophenyl) - 5 - oxo - 3 - pyrrolidinecarboxylic acid, ethyleneglycol ester
(125) 1 - (2,4,5 - trichlorophenyl) - 5 - oxo - 3 - pyrrolidinecarboxylic acid, hydroxyethylamine salt
(126) 1 - phenyl - 5 - oxo - 3 - pyrrolidinecarboxylic acid, amonium salt
(127) 1 - phenyl - 5 - oxo - 3 - pyrrolidinecarboxylic acid, ethylenediamine salt
(128) 1 - phenyl - 5 - oxo - 3 - pyrrolidinecarboxylic acid, bis(2 - hydroxyethyl)amine salt
(129) 1 - (p - chlorophenyl) - 5 - oxo - 3 - pyrrolidinecarboxylic acid, methylamine salt
(130) 1 - (p - chlorophenyl) - 5 - oxo - 3 - pyrrolidinecarboxylic acid, dodecylamine salt
(131) 1 - (p - chlorophenyl) - 5 - oxo - 3 - pyrrolidinecarboxylic acid, 3-methoxypropyl amine salt
(132) 1 - p - chlorophenyl) - 5 - oxo - 3 - pyrrolidinecarboxylic acid, trimethylamine salt
(133) 1 - (p - chlorophenyl) - 5 - oxo - 3 - pyrrolidinecarboxylic acid, chloroethylamine salt
(134) 1 - (3,4 - dichlorophenyl) - 5 - oxo - 3 - pyrrolidinecarboxylic acid, diethylamine salt
(135) 1 - (3,4 - dichlorophenyl) - 5 - oxo - 3 - pyrrolidinecarboxylic acid, N,N-dimethyldodecylamine salt
(136) 1 - (3,4 - dichlorophenyl) - 5 - oxo - 3 - pyrrolidinecarboxylic acid, triethylamine salt
(137) 1 - (3,4 - dichlorophenyl) - 5 - oxo - 3 - pyrrolidinecarboxylic acid, dimethylamine salt
(138) 1 - (3,4 - dichlorophenyl) - 5 - oxo - 3 - pyrrolidinecarboxylic acid, ethylenediamine salt
(139) 1 - (3,4 - dichlorophenyl) - 5 - oxo - 3 - pyrrolidinecarboxylic acid, hexylamine salt
(140) 1 - (3,4 - dichlorophenyl) - 5 - oxo - 3 - pyrrolidinecarboxylic acid, dihydroxyethylamine salt
(141) 1 - (2,4,5 - trichlorophenyl) - 5 - oxo - 3 - pyrrolidinecarboxylic acid, dimethylamine salt
(142) 1 - (2,4,5 - trichlorophenyl) - 5 - oxo - 3 - pyrrolidinecarboxylic acid, butylamine salt
(143) 1 - (2,4,5 - trichlorophenyl) - 5 - oxo - 3 - pyrrolidinecarboxylic acid, octylamine salt
(144) 1 - (2,4,5 - trichlorophenyl) - 5 - oxo - 3 - pyrrolidinecarboxylic acid, dibutylamine salt
(145) 1 - (2,4,5 - trichlorophenyl) - 5 - oxo - 3 - pyrrolidinecarboxylic acid, tributylamine salt Plant growth regulant compositions of the present invention containing at least one of the compounds of Formula I above can be prepared by admixing at least one of these compounds with pest control adjuvants or modifiers to provide compositions in the form of dusts, granules, solutions, water-dispersible powders and aqueous dispersions or emulsions.

Thus, the compounds of Formula I can be used with a carrier or diluent agent such as a finely divided solid, a solvent liquid of organic origin, water, a wetting agent, a dispersing agent, an emulsifying agent, an aqueous emulsion or any suitable combination of these.

Compositions of the invention, especially liquids and wettable powders, contain as a conditioning agent one or more surface-active agents in amounts sufficient to render a given composition containing the compounds of Formula I readily dispersible in water or in oil. By the term "surface-active agent," it is understood that wetting agents, dispersing agents, suspending agents and emulsifying agents are included.

Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth by J. W. McCutcheon in "Soap and Chemical Specialties," December 1957, January, February, March and April 1958. See also McCutcheon in "Chemical Industries," November 1947, page 8011 et seq., entitled "Synthetic Detergents"; "Detergents and Emulsifiers—Up to Date" (1960), by Johns W. McCutcheon, Inc., and Bulletin E–607 of the Bureau of Entomology and Plant Quarantine of the U.S. Department of Agriculture. In general, less than 10 percent by weight of the surface-active agent is present in the compositions of this invention, although usually the amount of surface-active agent in these compositions is less than 2 percent by weight. However, levels as high as 4 parts of surfactant for each part of N-substituted-oxo-pyrrolidinecarboxylic acid gives unusual and unexpected beneficial results. Such compositions have a greater plant growth regulant effectiveness than can be expected from a consideration of the activity of the components used separately.

Several different types of compositions containing the compounds of Formula I have been developed so that the compounds of Formula I can be used to greatest advantage to regulate plant growth. These preferred formulations comprise certain wettable powders, certain aqueous suspensions, certain dusts, certain emulsifiable oils, solutions in certain solvents, and certain granules. In general, these preferred compositions will all usually contain a wetting agent, a dispersant, or an emulsifying agent.

Wettable powders are water-dispersible compositions containing the active material, an inert solid extender, and one or more surfactants to provide rapid wetting and prevent heavy flocculation when suspended in water.

The inert extenders which should be used in the preferred wettable powders of this invention containing the compounds of Formula I are preferably of mineral origin and the surfactants are preferably anionic or non-ionic.

Suitable surfactants for use in such compositions are listed by J. W. McCutcheon in "Soap and Chemical Specialties," December 1957, January, February, March and April 1958. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant, but such types are usually avoided because of the difficulty in obtaining homogeneous distribution through the solid mass.

Most preferred fillers for this invention are kaolinites, attapulgite clay and synthetic magnesium silicate. Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 50 to 90 weight percent active material, from 0.5 to 2.0 weight percent wetting agent, from 0.25 to 5.0 weight percent dispersant, and from 10 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

Aqueous suspensions are prepared by mixing together and sandgrinding an aqueous slurry of water-insoluble active ingredient in the presence of dispersing agents to obtain a concentrated slurry of very finely-divided particles, in which the active ingredient is substantially all below 5 microns in size. The resulting concentrated aqueous suspension is characterized by its extremely small particle size, so that when diluted and sprayed coverage is very uniform.

Water dispersible powders are prepared from the water-soluble salts of this invention. In certain cases the dry salt is dissolved in water without any other additive present and the resultant aqueous solution is sprayed on the locus to be treated. In other cases finely divided inert solid extenders and surfactants are blended with the active ingredient. Upon extension with water the active component first disperses and then dissolves, leaving the inert solid in suspension to act as a tracer.

Dusts are dense powder composition which are intended for application in dry form, in accordance with the preferred compositions and methods of the invention. Dusts are characterized by their free-flowing and rapid settling properties so that they are not readily wind-borne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferably anionic or non-ionic, and suitable absorptive grinding aids are of mineral origin.

Suitable classes of inert solid extenders for use here are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation, some liquid non-ionic agents are also suitable in this invention.

Preferred inert solid extenders for the dusts of this invention are micaceous talcs, pyrophyllite, dense kaolin clays, ground calcium phosphate rock such as that known as "Phosphodust" (a trademark of the American Agricultural Chemical Company) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are hydrocarbons (substitued or unsubstituted), and non-water miscible ethers, esters, or ketones. Suitable surfactants are those anionic or non-ionic agents known to the art as emulsifying agents. Such compounds can be found listed by J. B. McCutcheon in "Soap and Chemical Specialties" for December 1957, and January, February, March, and April of 1958, and in "Detergents and Emulsifiers—Up to Date" (1960), by John W. McCutcheon, Inc.

Emulsifying agents most suitable for the compositions of this invention are alkyl aryl polyethoxy alcohols, alkyl and alkyl aryl polyether alcohols, polyoxyethylene sorbitol or sorbitan fatty acid esters, polyethylene glycol fatty esters, fatty alkyllol amide condensates, amine salts of fatty alcohol sulfates plus long chain alcohols and oil soluble petroleum sulfonates. Such emulsifying agents will comprise from about 3 to 10 weight percent of the total composition. As described above, however, up to 4 parts of emulsifying agent for each part of N-substituted oxopyrrolidinecarboxylic acid can be used to give synergistic results.

Thus, emulsifiable oil compositions of the present invention will consist of from about 25 to 50 weight percent active material, about 40 to 72 weight percent solvent, and about 3 to 10 weight percent emulsifier, as these terms are defined and used above.

Granules are physically stable, particulate compositions containing active material (here, the compounds of Forula I) adhering to or distributed through a basic matrix of a coherent, inert carrier with macroscopic dimensions. In order to aid leaching of active from the granule, a surfactant is usually present.

For the compounds of this invention, the inert carrier is preferably of mineral origin, and the surfactant is a compound known to the art as a wetting agent. Such compounds are listed by J. B. McCutcheon in "Soap and Chemical Specialties," December 1957, January, February, March and April 1958.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second suitable types are initially powdered kaolin clays, hydrated attapulgite, or bentonitic clays, either sodium, calcium, or magnesium bontonites. These are blended with the active components to give mixtures that are granulated and dried to yield granular material with the active component distributed uniformly throughout the mass. Such granules can also be made with 25 to 30 weight percent active component, but more frequently a concentration of about 10 weight percent is desired for optimum distribution. The granular compositions of this invention are most useful in a size range of 15-30 mesh.

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkyl aryl polyether alcohols, alkyl polyether alcohols, polyoxyethylene sorbitol or sorbitan fatty acid esters, polyethylene glycol fatty esters, fatty alkylol amide condensates and oil soluble petroleum or vegetable oil sulfonates. Such agents will usually comprise from about 0 to 5 weight percent of the total composition.

When the active is first mixed with a powdered carrier and subsequently granulated, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular formulations of this invention comprise about 15 to 30 mesh granules containing from about 5 to 30 weight percent active material, about 0 to 5 weight percent wetting agent, and about 65 to 95 weight percent inert mineral carrier, as these terms are used herein.

The compounds of this invention are active as plant growth regulants at rates as low as 0.1 pound per acre. In certain instances, as much as 15 pounds per acre may be used for regulating plant growth without serious adverse effects on plants. Higher rates can of course be employed if the user desires. The compounds are usually applied as soil-foliage treatments to the area although either foliage treatments on plants or soil treatments prior to emergence of the plants are effective. In certain cases, it is desirable to treat the seeds of plants prior to planting to induce growth regulating effects.

In order that the invention can be better understood, the following additional examples are given. These examples illustrate the method of making the compounds of Formula I, compositions prepared using such compounds, methods for preparing the compositions, methods of using the compounds of Formula I, and the results obtained.

USE OF INVENTION

The following examples illustrate typical compounds of the invention, their methods of preparation, formulations, and methods for the use of these compositions. Examples 1-38 illustrate methods of preparation.

(I) Free Acids

EXAMPLE 1.—1-(p-CHLOROPHENYL)-5-OXO-3-PYRROLIDINECARBOXYLIC ACID

A mixture of 51 parts by weight of p-chloroaniline and 52 parts by weight of itaconic acid is fused at 120-140° for 2 hours. After cooling slightly, the reaction mixture is poured into a solution of 20 parts by weight of sodium hydroxide in 600 parts by weight of water. After thorough mixing, the insoluble by-product is filtered. The filtrate is acidified and the precipitate removed, washed with water and dried to yield essentially pure 1-(p-chlorophenyl)-5-oxo-3-pyrrolidinecarboxylic acid; M.P. 150-152° C.

EXAMPLE 2.—1-PHENYL-5-OXO-3-PYRROLIDINECARBOXYLIC ACID

A solution of 37.2 parts by weight of aniline and 52 parts by weight of itaconic acid in 600 parts by weight of water is heated at reflux for one hour, the solution cooled and the product collected by filtration. This product is dissolved in a solution of 20 parts by weight of sodium hydroxide in 400 parts by weight of water and this solution purified by treatment with decolorizing carbon and filtration. The filtrate is acidified, the precipitate filtered, washed with water, and dried to yield essentially pure 1-phenyl-5-oxo-3-pyrrolidinecarboxylic acid; M.P. 191-193° C.

The compounds of Examples 3-17 are prepared by substituting equivalent amounts of the indicated aryl amines for p-chloroaniline in Example 1.

| Example | Aryl amine | Pts. by weight | Product |
|---|---|---|---|
| 3 | o-Chloroaniline | 51.0 | 1-(o-chlorophenyl)-5-oxo-3-pyrrolidinecarboxylic acid. |
| 4 | m-Chloroaniline | 51.0 | 1-(m-chlorophenyl)-5-oxo-3-pyrrolidinecarboxylic acid. |
| 5 | o-Fluoroaniline | 44.5 | 1-(o-fluorophenyl)-5-oxo-3-pyrrolidinecarboxylic acid. |
| 6 | p-Bromoaniline | 68.8 | 1-(p-bromophenyl)-5-oxo-3-pyrrolidinecarboxylic acid. |
| 7 | 3,4-dichloroaniline | 64.8 | 1-(3,4-dichlorophenyl)-5-oxo-3-pyrrolidinecarboxylic acid. |
| 8 | 2,5-dichloroaniline | 64.8 | 1-(2,5-dichlorophenyl)-5-oxo-3-pyrrolidinecarboxylic acid. |
| 9 | 3,5-dichloroaniline | 64.8 | 1-(3,5-dichlorophenyl)-5-oxo-3-pyrrolidinecarboxylic acid. |
| 10 | 2,4-dichloroaniline | 64.8 | 1-(2,4-dichlorophenyl)-5-oxo-3-pyrrolidinecarboxylic acid. |
| 11 | 2,4,5-trichloroaniline. | 78.6 | 1-(2,4,5-trichlorophenyl)-5-oxo-3-pyrrolidinecarboxylic acid. |
| 12 | m-Aminobenzotrifluoride. | 64.5 | 1-(alpha,alpha,alpha-trifluoro-m-polyl)-5-oxo-3-pyrrolidinecarboxylic acid. |
| 13 | p-Aminobenzotrifluoride. | 64.5 | 1-(alpha,alpha,alpha-trifluoro-p-polyl)-5-oxo-3-pyrrolidinecarboxylic acid. |
| 14 | 3-Amino-4-chlorobenzotrifluoride. | 78.2 | 1-(3-alpha,alpha,alpha-trifluoromethyl-4-chlorophenyl)-5-oxo-3-pyrrolidinecarboxylic acid. |
| 15 | 3-Amino-4-bromobenzotrifluoride. | 96.0 | 1-(3-alpha,alpha,alpha-trifluoromethyl-4-bromophenyl)-5-oxo-3-pyrrolidinecarboxylic acid. |
| 16 | 3-Amino-4-fluorobenzotrifluoride. | 71.6 | 1-(3-alpha,alpha,alpha-trifluoromethyl-4-fluorophenyl)-5-oxo-3-pyrrolidinecarboxylic acid. |
| 17 | 5-Amino-2-chlorobenzotrifluoride. | 78.2 | 1-(2-chloro-4-alpha,alpha,alpha-trifluoromethylphenyl)-5-oxo-3-pyrrolidinecarboxylic acid. |

(II) Amides

EXAMPLE 18.—N,N-DIMETHYL-1-(3,4-DICHLOROPHENYL)-5-OXO-3-PYRROLIDINECARBOXAMIDE

The acyl chloride of 1-(3,4-dichlorophenyl)-5-oxo-3-pyrrolidinecarboxylic acid is prepared by methods well known in the literature. To a refluxing suspension of 41.1 parts by weight of 1-(3,4-dichlorophenyl)-5-oxo-3-pyrrolidinecarboxylic acid in 600 parts by weight of dry benzene is added slowly with stirring 19.8 parts by weight of thionyl chloride in 40 parts by weight of benzene. After 4 hours, 2 parts by weight of additional thionyl chloride is added and the reaction heated to reflux for 2 more hours. The solution is allowed to cool, filtered, and evaporated to dryness to yield the acyl chloride of 1-(3,4-dichlorophenyl)-5-oxo-3-pyrrolidinecarboxylic acid, M.P. 95-98° C. with decomposition.

For one hour, dimethylamine is bubbled through a solution of the acyl chloride of 1-(3,4-dichlorophenyl)-5-oxo-3-pyrrolidinecarboxylic acid in benzene. The mixture formed is extracted with water, filtered, and the benzene evaporated to yield the product. Recrystallization gives N,N-dimethyl - 1 - (3,4-dichlorophenyl) - 5-oxo-3-pyrrolidinecarboxamide; M.P. 130–133° C.

EXAMPLE 19.—N,N-DIETHYL-1-(p-CHLOROPHENYL)-5-OXO-3-PYRROLIDINECARBOXAMIDE

The acyl chloride of 1-(p-chlorophenyl)-5-oxo-3-pyrrolidinecarboxylic acid is prepared by substitution of 36 parts of 1-(p-chlorophenyl) - 5 - oxo-3-pyrrolidinecarboxylic acid for 1-(3,4-dichlorophenyl)-5-oxo-3-pyrrolidinecarboxylic acid in the portion of Example 18 dealing with formation of the acyl chloride.

To a solution of 24 parts by weight of the acyl chloride of 1-(p-chlorophenyl)-5-oxo-3-pyrrolidinecarboxylic acid in warm benzene is added 7.3 parts of diethylamine. The solution is allowed to cool, extracted with water, filtered, and the benzene evaporated to yield N,N-diethyl-1-(p-chlorophenyl)-5-oxo-3-pyrrolidinecarboxamide.

The compounds of Examples 20, 21 and 22 are prepared by substitution of the indicated acyl chlorides, prepared by methods known to the art and indicated above, for the acid chlorides of 1-(3,4-dichlorophenyl)-5-oxo-3-pyrrolidinecarboxylic acid and the indicated amines for dimethylamine in Example 18.

| Example | Acyl chloride derived from— | Amine | Product |
|---|---|---|---|
| 20 | 1-phenyl-5-oxo-3-pyrrolidinecarboxylic acid. | Methylamine | N-methyl-1-phenyl-5-oxo-3-pyrrolidinecarboxamide. |

| Ex. | Acyl chloride derived from | PBW | Amine | PBW | Product |
|---|---|---|---|---|---|
| 21 | 1-(2,5-dichlorophenyl)-5-oxo-3-phrrolidinecarboxylic acid. | 29.3 | n-propylamine | 5.9 | N-n-propyl-(2,4-dichlorophenyl)-5-oxo-3-pyrrolidinecarboxamide. |
| 22 | 1-(3,4-dichlorophenyl)-5-oxo-3-pyrrolidinecarboxylic acid. | 29.3 | iso-butylamine | 7.3 | N-iso-butyl-1-(3,4-dichlorophenyl)-5-oxo-3-pyrrolidinecarboxamide. |

(III) Esters

EXAMPLE 23.—ISOPROPYL 1-(p-CHLOROPHENYL)-5-OXO-3-PYRROLIDINECARBOXYLATE

The acyl chloride of 1-(p-chlorophenyl)-5-oxo-3-pyrrolidinecarboxylic acid, prepared as described in Example 18, is reacted with anhydrous isopropyl alcohol (ca. 10 parts by weight). Evaporation to dryness yields isopropyl 1-(p-chlorophenyl)-5-oxo-3-pyrrolidinecarboxylate.

The compounds of Example 24–27 are prepared by substitution of the indicated acyl chloride, prepared as described above, for the acyl chloride of 1-(p-chlorophenyl)-5-oxo-3-pyrrolidinecarboxylic acid and the indicated anhydrous alcohol for isopropyl alcohol in Example 23.

| Ex. | Acyl chloride derived from— | Alcohol | Product |
|---|---|---|---|
| 24 | 1-(3,4-dichlorophenyl)-5-oxo-3-pyrrolidine-carboxylic. | Ethanol | Ethyl 1-(3,4-dichlorophenyl)-5-oxo-3-pyrrolidine-carboxylate. |
| 25 | 1-phenyl-5-oxo-3-pyrrolidinecarboxylic acid. | Methyl | Methyl 1-phenyl-5-oxo-3-pyrrolidinecarboxylate. |
| 26 | 1-(3,4-dichlorophenyl)-5-oxo-3-pyrrolidine-carboxylic acid. | Isoamyl | Isoamyl 1-(3,4-dichlorophenyl)-5-oxo-3-pyrrolidinecarboxylate. |
| 27 | 1-(p-chlorophenyl)-5-oxo-3-pyrrolidine-carboxylic acid. | n-Hexanol | n-Hexyl 1-(p-chlorophenyl)-5-oxo-3-pyrrolidinecarboxylate |

EXAMPLE 28.—n-BUTYL 1-(m-CHLOROPHENYL)-5-OXO-3-PYRROLIDINECARBOXYLATE

To 29.3 parts by weight of the acyl chloride of 1-(3,4-dichlorophenyl) - 5 - oxo - 3-pyrrolidinecarboxylic acid is added 7.4 parts by weight of n-butyl alcohol in 12.1 parts by weight of dimethylaniline. The mixture is heated for 4 hours on a steam bath, allowed to cool, and taken up in ether and water. The ether layer is rinsed several times with cold, dil. HCl and once with 5% sodium bicarbonate solution. The ether fraction is dried and evaporated to yield n-butyl 1-(3,4-dichlorophenyl)-5-oxo-3-pyrrolidinecarboxylate.

(IV) Salts

EXAMPLE 29.—SODIUM 1-(p-CHLOROPHENYL)-5-OXO-3-PYRROLIDINECARBOXYLATE

Method A.—A solution of 1.6 parts by weight of sodium hydroxide in 100 parts by weight of water is added to 10.1 parts by weight of 1-(p-chlorophenyl)-5-oxo-3-pyrrolidinecarboxylic acid. The solution is reduced to dryness to yield sodium 1-(p-chlorophenyl)-5-oxo-3-pyrrolidinecarboxylate.

Method B.—To 24.0 parts by weight of 1-(p-chlorophenyl)-5-oxo-3-pyrrolidinecarboxylic acid in a minimum volume of boiling ethanol is added a solution of sodium hydroxide prepared from 5.7 parts by weight of sodium ethylate, 30 parts by weight of ethanol and 1.9 parts by weight of water. Heating was continued for 5 minutes and the suspension cooled. Filtration and drying of the product yielded sodium 1-(p-chlorophenyl)-5-oxo-3-pyrrolidinecarboxylate.

By substitution of equivalent amounts of the indicated acids for 1-(p-chlorophenyl) - 5-oxo-3-pyrrolidinecarboxylic acid in Example 29, method B, the corresponding sodium salts are prepared.

| Example | Acid | Salt |
|---|---|---|
| 30 | 1-(3,4-dichlorophenyl)-5-oxo-3-pyrrolidinecarboxylic acid. | Sodium 1-(3,4-dichlorophenyl)-5-oxo-3-pyrrolidinecarboxylate. |
| 31 | 1-(4-chloro-3-alpha,alpha,alpha-trifluoromethylphenyl)-5-oxo-3-pyrrolidinecarboxylic acid. | Sodium 1-(4-chloro-3-trifluoromethylphenyl)-5-oxo-3-pyrrolidinecarboxylate. |

EXAMPLE 32.—AMMONIUM 1-(3,4-DICHLOROPHENYL)-5-OXO-3-PYRROLIDINECARBOXYLATE

Excess ammonia is bubbled through a solution of 1-(3,4-dichlorophenyl) - 5 - oxo-3-pyrrolidinecarboxylic acid in ethanol. The solution is evaporated to dryness under vacuum to yield ammonium 1-(3,4 - dichlorophenyl) - 5-oxo-3-pyrrolidinecarboxylate.

The compounds of Examples 33 and 34 are prepared by substitution of the indicated acid for 1-(3,4-dichlorophenyl)-5-oxo-3-pyrrolidinecarboxylic acid and the indicated amine for ammonia in Example 32.

| Ex. | Acid | Amine | Product |
|---|---|---|---|
| 33 | 1-phenyl-5-oxo-3-pyrrolidinecarboxylic acid. | Methylamine | Methylammonium 1-phenyl-5-oxo-3-pyrrolidinecarboxylate. |
| 34 | 1-(p-bromophenyl)-5-oxo-3-pyrrolidinecarboxylic acid. | Dimethylamine | Dimethylammonium 1-(p-bromophenyl)-5-oxo-3-pyrrolidinecarboxylate. |

EXAMPLE 35.—PROPYLAMMONIUM 1-PHENYL-5-OXO-3-PYRROLIDINECARBOXYLATE

To a solution of 20.5 parts by weight of 1-phenyl-5-oxo-3-pyrrolidinecarboxylic acid in ethanol is added 5.9 parts by weight of n-propyl amine. The solution is stirred and evaporated to dryness to yield n-propylammonium 1-phenyl-5-oxo-3-pyrrolidinecarboxylate.

The compounds of Examples 36–37 are prepared by substitution of the equivalent amounts of the indicated acids for 1-phenyl-5-oxo-3-pyrrolidinecarboxylic acid and of the indicated amines for n-propylamine in Example 35.

| Ex. | Acid | Amine | Product |
| --- | --- | --- | --- |
| 36 | 1-(o-chlorophenyl)-5-oxo-3-pyrrolidinecarboxylic acid, 24.0 parts by wt. | Sec-butylamine, 7.3 parts by wt. | Sec-butylammonium 1-(o-chlorophenyl)-5-oxo-3-pyrrolidinecarboxylate. |
| 37 | 1-(3-trifluoromethylphenyl)-5-oxo-3-pyrrolidinecarboxylic acid, 27.3 parts by wt. | n-hexylamine, 10.1 parts by wt. | n-Hexylammonium 1-(3-trifluoromethylphenyl)-5-oxo-3-pyrrolidinecarboxylate. |

EXAMPLE 38.—FERRIC 1-(p-CHLOROPHENYL)-5-OXO-3-PYRROLIDINECARBOXYLATE

To 11 parts by weight of sodium 1-(p-chlorophenyl)-5-oxo-3-pyrrolidinecarboxylate in 40 parts of water is added a solution of 13.5 parts by weight of ferric chloride in 20 parts by weight of water. The thick precipitate is diluted with 40 parts by weight of water, filtered, washed thoroughly with water, and dried to yield pure ferric 1-(p - chlorophenyl) - 5 - oxo - 3 - pyrrolidinecarboxylate, M.P. 127–133°.

In the following formulation examples the percentages are all by weight.

EXAMPLE 39      Percent
1 - (p - chlorophenyl) - 5 - oxo - 3 - pyrrolidinecarboxylic acid _____ 80
Alkylnaphthalenesulfonic acid, Na salt _____ 1.5
Low viscosity methyl cellulose _____ 0.25
Attapulgite clay _____ 18.25

The above wettable powder is prepared by blending the components together and grinding in a micropulverizer until substantially all the particles are below 50 microns, then reblending to homogeneity.

(a) This formulation is extended in 25 gallons of water and applied at the rate of 0.1 pound per acre of active ingredient to white clover, alfalfa, sweet clover and subterranean clover. This treatment causes a reduction in the number of flowers produced and indirectly provides for increased yields of forage per acre.

(b) This formulation is applied at 2 pounds (active) per acre in 60 gallons of water per acre as a foliage spray just before the squares appear on cotton plants. This treatment gives an increase in the number of squares, flowers and bolls per plant.

(c) The formulation is extended in 60 gallons of water. It is applied at a rate of 10 lbs./a. active ingredient with a tractor-mounted sprayer to areas of sparsely established grass, in areas such as ditchbanks, waterways and earthen dams. The treatment causes increased numbers of tillers or shoots to be produced by the established grass, thus forming a denser mat of vegetation. Volunteer mustard, buckhorn plantain growing in this area show marked albinism and retardation at three weeks after treatment.

(d) At 12 pounds (active) per acre in 80 gallons of water, this compound causes a marked retardation in the growth of privet, holly, and Lombardy poplar seedlings. Some albinism is noted on the new growth.

EXAMPLE 40      Percent
1 - (m - chlorophenyl) - 5 oxo - pyrrolidinecarboxylic acid _____ 80
Sodium "Lorol" sulfate _____ 0.5
Low viscosity polyvinyl alcohol _____ 0.5
Attapulgite clay _____ 19

The above wettable powder is prepared in the same manner as Example 91. The composition is diluted with water so that 10 pounds (active) per acre is applied in 125 gallons water to a young weed infestation (foxtail, crabgrass, mustard, pigweed, lambs quarter, and beggar tick) growing along a roadside. These plants exhibit retarded growth and no mowing is required for several weeks after treatment.

EXAMPLES 41–45

Each product compound in Examples 5, 6, 12, 13 and 14 is substituted one at a time in like amount by weight for the 1-(m-chlorophenyl)-5-oxo-3-pyrrolidinecarboxylic acid in Example 40. Each compond is formulated in the manner described in Example 40 to give substantially the same results when applied in like manner at like rates.

EXAMPLE 46      Percent
1-phenyl-5-oxo-3-pyrrolidinecarboxylic acid _____ 75
Alkylnaphthalenesulfonic acid, Na salt _____ 1.0
Sodium naphthalenesulfonic acid _____ 2.0
Attapulgite clay _____ 22.0

The above wettable powder is prepared by blending the dry components and grinding until substantially all of the product is below 50 microns.

The composition is extended with water and applied with a convenient sprayer at a rate of 8 pounds (active) per acre for th econtrol of volunteer alfalfa plants in a field of perennial fescue grass.

EXAMPLE 47      Percent
1 - (4 - chloro - 3 - alpha,alpha,alpha - trifluoromethylphenyl)-5-oxo-3-pyrrolidinecarboxylic acid _____ 50
Oleic acid ester of sodium isethionate _____ 4
Neutral synthetic magnesium silicate _____ 46

The above wettable powder is prepared by blending the components and grinding until substantially all particles are below 50 microns.

The composition is diluted with 125 gallons water and applied post-emergence at the rate of 25 pounds (active) per acre with a tractor-mounted sprayer to a roadside area infested with Johnson grass, foxtail, sheep sorrel, plantain and cockleburr. The broadleaf plants are retarded severely and eventually die. The Johnson grass and foxtail plants produce numerous axially tillers which results in a thick turf. Growth of the Johnson grass and foxtail is retarded and fewer roadside mowings are made during the summer growing season.

EXAMPLES 48–50

Each compound described as a product in Examples 15, 16 and 17 is substituted one at a time in like amount by weight for the 1-(4-chloro-3-alpha,alpha,alpha-trifluoromethylphenyl)-5-oxo-3-pyrrolidinecarboxylic acid of Example 47. Each compound is formulated in the same manner as described for the active compound in Example 47 to give substantially the same result when applied at like manner at like rates.

EXAMPLE 51      Percent
1-(3,4-dichlorophenyl)-5-oxo - 3 - pyrrolidinecarboxylic acid_____ 25
Attapulgite clay_____ 6.25
Anhydrous $Na_2SO_4$_____ 5.00
Ca, Mg bentonite_____ 63.75

The above composition is prepared by first blending together the acid, the attapulgite and the $Na_2SO_4$, then grinding and blending this mix with the Ca, Mg bentonite. Finally the mix is moistened with water, extruded and dried to yield pellets suitable for airplane application or for application with a fertilizer spreader.

This composition when applied at 20 lb./a. (active) as a soil application causes growth retardation of woody plants such as privet and holly.

EXAMPLE 52

| | Percent |
|---|---|
| 1-(p-bromophenyl)-5-oxo - 3 - pyrrolidinecarboxylic acid | 5 |
| Partially hydrated attapulgite | 95 |

The above composition is prepared in granular form by first micropulverizing the active component, then blending with the clay, moistening with water and granulating the product, followed by drying. The resulting granules are suitable for application by hand or with a fertilizer spreader.

This composition is used at a rate of 20 lb./a. (active) in the same manner as Example 51.

EXAMPLE 53

| | Percent |
|---|---|
| N,N-diethyl - 1 - (p-chlorophenyl)-5-oxo-3-pyrrolidinecarboxamide | 30 |
| Sodium lignin sulfonate | 15 |
| Hydrated attapulgite | 1.75 |
| Dioctyl sodium sulfosuccinate | 1.0 |
| Water | 52.25 |

The above aquous suspension is prepared by first mixing and sand-grinding together all of the components except the dioctyl sodium sulfosuccinate and enough water to prepare a concentrated solution of this wetting agent. When the product has been ground until the active is substantially all below 5 microns, grinding is discontinued and the solution of wetting agent added. The product is characterized by its extremely small particle size and low surface tension so that when diluted and sprayed, the plant foliage is very uniformly coated.

The composition is diluted with 80 gallons of water and applied at a rate of 10 pounds/a. (active) to hedge plants such as privet or multiflora rose, with a convenient common garden sprayer. Application results in retarded growth of these plants.

EXAMPLES 54–56

The product compound described in Examples 20, 21 and 22 are each substituted one at a time in like amount by weight for the N,N-diethyl-1-(p-chlorophenyl)-5-oxo-3-pyrrolidinecarboxamide in Example 53. Each compound is formulated in the same manner as the active compound in Example 53 to give substantially the same results when applied in like manner at like rates.

EXAMPLE 57

| | Percent |
|---|---|
| N,N-dimethyl-1-(3,4-dichlorophenyl)-5 - oxo - 3-pyrrolidinecarboxamide | 50 |
| Dioctyl sodium sulfosuccinate | 1 |
| Partially desulfonated sodium lignin sulfonate | 0.5 |
| Kaolin clay | 48.5 |

The above wettable powder is prepared in the same manner as Example 39.

This formulation is used in a similar manner as that described in Example 53.

EXAMPLE 58

| | Percent |
|---|---|
| Ethyl 1-(3,4-dichlorophenyl)-5-oxo-3-pyrrolidenecarboxylate | 20 |
| Alkyl aryl polyether alcohol | 5 |
| Xylene | 75 |

The above emulsifiable oil is prepared by mixing the components with agitation until a homogeneous solution results. The oil may be emulsified with water or extended with additional oil for application.

This formulation is applied at the rate of 15 lbs./a. (active) in 100 gallons diesel oil. Excellent control of a mixed population of annual broadleaf and grass weed species is obtained.

EXAMPLES 59–62

The product compound in Examples 23, 25, 26 and 27 is substituted in like amount by weight for the eithyl-1-(3,4-dichlorophenyl)-5-oxo-3-pyrrolidinecarboxylate in Example 58. Each compound is formulated in the same manner as described for the active compound in Example 58 to give substantially the same results when applied in like manner at like rates.

EXAMPLE 63

| | Percent |
|---|---|
| Sodium 1-(p-bromophenyl)-5-oxo - 3 - pyrrolidinecarboxylate | 50 |
| Sodium N-methyl-N-palmitoyl taurate | 2 |
| Kaolin clay | 48 |

The above dispersible powder is prepared by blending the components and micropulverizing. Upon extension with water the active component first disperses and then dissolves, leaving the clay in suspension to act as a tracer for indication of coverage when sprayed.

The formulation is extended in 60 gal. of water. It is applied at a rate of 2 lb./a. active ingredient with a tractor-mounted sprayer to rows of privet liners in early summer. Growth of the terminal bud is retarded while growth of the axillary buds is stimulated, producing short bushy plants without repeated hand pruning.

EXAMPLES 64–65

The product compound of Examples 30 and 31 are each substituted for the sodium 1-(p-bromophenyl)-5-oxo-3-pyrrolidinecarboxylate in Example 63 one at a time in like amount by weight. Each compound is formulated in the same manner as the active compound in Example 63 to give substantially the same results when applied in like manner at like rates.

EXAMPLE 66

| | Percent |
|---|---|
| Sodium 1-(p-chlorophenyl)-5-oxo - 3 - pyrrolidinecarboxylate | 10 |
| Diatomaceous silica | 5 |
| Micaceous talc | 85 |

The above dust is repared by blending and grinding the active material with the minor diluent, then blending the resulting powder with the major diluent.

This dust formulation is applied with a tractor-mounted duster to cotton plants at the rate of 2 lbs./a. of active ingredient, just before the squares appear. The treatment results in increased number of squares, flowers and bolls per plant.

EXAMPLE 67

| | Percent |
|---|---|
| Ammonium 1 - (3,4 - dichlorophenyl) - 5 - oxo - 3-pyrrolidinecarboxylate | 5 |
| Alkyl naphthalene sulfonic acid, Na salt | 1 |
| 15–30 mesh Attaclay | 94 |

The active material and surfactant are dissolved in water and sprayed upon the Attaclay while tumbling the latter. The product is then dried to yield granules suitable for hand or machine application.

This formulation applied at 4 lbs./a. (active) causes a reduction in the number of flowers produced on alfalfa, soybeans, and Black Valentine bean plants.

EXAMPLE 68

| | Percent |
|---|---|
| 1 - (o - chlorophenyl) - 5 - oxo - 3 - pyrrolidinecarboxylic acid | 80 |
| Sodium lauryl sulfate | 0.6 |
| Sodium lignin sulfonate | 1.0 |
| Attapulgite clay | 18.4 |

The above wettable powder is prepared by blending the components, double micropulverizing through an 0.020″ screen, and reblending.

This formulation applied at 8 lbs./a. (active) in 80 gallons water, retards growth of annual weeds when applied as a foliage spray.

EXAMPLE 69

| | Percent |
|---|---|
| 1 - (m - chlorophenyl) - 5 - oxo - 3 - pyrrolidinecarboxylic acid, sodium salt | 50 |
| Sodium naphthalene sulfonate | 4 |
| Kaolin clay | 46 |

The above components are blended together and micropulverized until substantially all particles are less than 50 microns. When placed in water, the product first disperses, followed by solution of the active component.

This formulation is applied at the rate of 2 pounds per acre in 40 gallons water to actively growing cotton plants. Marked stimuation of overall growth is noted after treatment.

EXAMPLE 70

1 - (m - chlorophenyl) - 5 - oxo - 3 - pyrrolidinecarboxylic acid, sodium salt, stimulates the growth of dwarf marigold plants. Sufficient of this material is dissolved in water to form a 100-parts per million solution, which is used to treat the soil around the plants. At two weeks after treatment there is a noticeable increase in the growth of treated plants when compared with those not treated.

EXAMPLE 71

| | Percent |
|---|---|
| Ethyl - 1 - (3,4 - dichlorophenyl) - 5 - oxo - 3 - pyrrolidinecarboxylate | 25 |
| Alkylphenol polyethylene oxide condensate | 13 |
| Xylene | 62 |

The above emulsifiable liquid is prepared by mixing together the mutually soluble components. The high level of surfactant is unnecessary for emulsification but is found to markedly increase the activity of the regulant.

This formulation is applied at the rate of 10 lbs./acre (active) in 100 gallons diesel oil. Excellent control of a mixed population of annual broadleaf and grass weed species is obtained and results in an increased stand of perennial grasses.

EXAMPLE 72

| | Percent |
|---|---|
| 1 - (3,4 - dichlorophenyl) - 5 - oxo - 3 - pyrrolidinecarboxylic acid, sodium salt | 15 |
| Sodium lauryl sulfate | 60 |
| Synthetic fine silica | 25 |

The above composition is prepared by blending, grinding, and reblending the components. When added to water, both the active material and the surfactant dissolve, leaving only silica in suspension. The high surfactant level is found to increase the activity of the composition so that much lower application rates are effective.

It is applied at a rate of 5–7 lbs./acre (active ingredient) with a tractor-mounted sprayer to areas of sparsely established grass. This treatment causes increased numbers of tillers or shoots to be produced by the established grass.

EXAMPLES 73–323

Each compound described above, numbered 1–145, is substituted one at a time in like amount by weight for the ethyl - 1 - (3,4 - dichlorophenyl) - 5 - oxo - 3 - pyrrolidinecarboxylate and 1 - (3,4 - dichlorophenyl) - 5-oxo-3-pyrrolidinecarboxylic acid, sodium salt in Examples 71 and 72 respectively. Each compound is formulated in the manner described in Examples 71 and 72 to give substantially the same results when applied in like manner at like rates.

This application is a continuation-in-part of our copending application Serial No. 807,317, filed April 20, 1959, now abandoned.

The invention claimed is:
1. A method of regulating plant growth, said method comprising contacting living plant tissue with a quantity, sufficient to exert the desired plant growth regulation, of a compound of the formula:

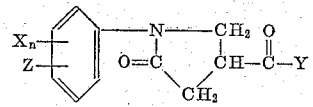

wherein
X is selected from the group consisting of hydrogen, fluorine, chlorine, bromine and iodine;
n is a whole positive integer less than 3;
Z is selected from the group consisting of hydrogen, trifluoromethyl, fluorine, chlorine, bromine and iodine;
Y is selected from the group consisting of OH, $OR_1$, $NR_2R_3$ and OM;
$R_1$ is an alkyl radical containing less than 9 carbon atoms;
$R_2$ and $R_3$ are selected from the group consisting of hydrogen and lower alkyl radicals of less than 7 carbon atoms each; and
M is a cation selected from the group consisting of sodium, potassium, calcium, lithium, magnesium, zinc, cupric, ferric, ammonium and amine salts containing less than 15 carbon atoms in the amine radical.

2. A plant growth regulant composition comprising one-half to five percent by weight of an anionic surface-active agent selected from the group consisting of alkyl benzene sulfonate, alkyl naphthalene sulfonate, sulfated fatty alcohol, long chain acid ester of sodium isethionate, ester of sodium sulfosuccinate, sodium lignin sulfonate, polymeric alkyl naphthalene sulfonate, polymethylene bisnaphthalene sulfonate and sodium N-methyl-N-(long chain acid)taurate, and twenty to eighty percent by weight of a compound of the formula:

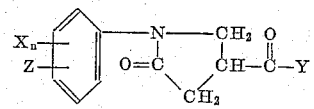

wherein
X is selected from the group consisting of hydrogen, fluorine, chlorine, bromine and iodine;
n is a whole positive integer less than 3;
Z is selected from the group consisting of hydrogen, trifluoromethyl, fluorine, chlorine, bromine and iodine;
Y is selected from the group consisting of OH, $OR_1$, $NR_2R_3$ and OM;
$R_1$ is an alkyl radical containing less than nine carbon atoms;
$R_2$ and $R_3$ are selected from the group consisting of hydrogen and lower alkyl radicals of less than seven carbon atoms each; and
M is a cation selected from the group consisting of sodium, potassium, calcium, lithium, magnesium, zinc, cupric, ferric, ammonium and amine salts containing less than fifteen carbon atoms in the amine radical.

References Cited in the file of this patent

UNITED STATES PATENTS

| 2,578,526 | Evans | Dec. 11, 1951 |
| 2,811,496 | Knuth | Oct. 29, 1957 |
| 2,984,673 | Bortnick et al. | May 16, 1961 |

OTHER REFERENCES

Paytash et al., in J. Am. Chem. Soc., vol. 72, page 1415 (1950).